United States Patent [19]

Parker

[11] Patent Number: 4,682,296
[45] Date of Patent: Jul. 21, 1987

[54] ULTRASONIC IMAGING

[75] Inventor: John A. Parker, Warrington, England

[73] Assignee: United Kingdom Atomic Energy Authority, London, England

[21] Appl. No.: 656,339

[22] Filed: Oct. 1, 1984

[30] Foreign Application Priority Data

Oct. 14, 1983 [GB] United Kingdom ............... 8327639

[51] Int. Cl.[4] .............. G01N 29/04; G01N 24/04; G06F 15/40; G06B 42/06
[52] U.S. Cl. .................... 364/518; 364/550; 367/7; 367/60; 73/628; 73/602
[58] Field of Search ........... 73/625, 628, 602, 626, 73/627; 364/414, 415, 413, 518, 550, 551; 340/825.64; 367/21, 60, 63, 7, 11, 87, 88, 105

[56] References Cited

U.S. PATENT DOCUMENTS 4,274,422  6/1981  Anderson et al. ............... 73/625 X
4,330,876  5/1982  Johnson ........................ 367/105
4,497,210  2/1985  Uchida et al. .................. 73/628 X
4,511,984  4/1985  Sumino et al. ................... 364/415
4,545,251  10/1985  Uchida et al. ................. 73/628 X
4,550,606  11/1985  Drost ............................ 73/626
4,598,363  7/1986  Clark et al. ..................... 364/200
4,611,494  9/1986  Uchiyama ...................... 73/628 X
4,622,978  11/1986  Matsuo et al. ................. 73/626 X
4,628,738  12/1986  Burckhardt et al. ............. 73/626

Primary Examiner—Parshotam S. Lall
Assistant Examiner—Joseph L. Dixon
Attorney, Agent, or Firm—William R. Hinds

[57] ABSTRACT

Ultrasonic imaging equipment comprising ultrasonic transducers (A, B, etc.) which are sequentially and repetitively triggerable by equally spaced triggers (Z) to give echoes which can be read, stored and processed in a computer-based recording device is characterized in having means to inhibit the triggers under control of the recording device so that, after one transmission, further transmissions do not take place prior to the recording device reading the echo from said one transmission.

5 Claims, 4 Drawing Figures

ULTRASONIC IMAGING

BACKGROUND OF THE INVENTION

This invention relates to ultrasonic data collection systems and is particularly concerned with problems arising when a number of ultrasonic transducers are sequentially and repetitively pulsed to give, from received echoes, a visual presentation of an object scanned by the transducers. One application of the invention arises with under-sodium viewing of components in a sodium-cooled fast reactor.

Ultrasonic imaging equipment customarily employs a computer-based echo recording device and means for controlling the repetition rate of pulses transmitted from the transducers of the equipment. Because of the finite time taken by the recording device to record echo data, the transmitted pulse repetition rate must be kept below a certain maximum. If this is not done, then the processing of data of one echo may prevent the recording of echoes sequentially received in the pulsing sequence. Further, if all the transducers are producing valid echoes, then alternate transducers will effectively be masked out. Systematically ignoring certain transducers can result in part of the target not being scanned and hence not imaged. One solution to this problem is to arrange for the repetition rate of pulses transmitted from the transducers to be reduced. This solution gives rise to loss of resolution in the imaging or increases the time to reach a given resolution.

FEATURES AND ASPECTS OF THE INVENTION

In accordance with the invention there is provided an ultrasonic data collection system comprising means for generating pulses with a constant repetition rate, means for sequentially routing the pulses to a plurality of ultrasonic transducers so as to initiate triggering of the transducers in a predetermined sequence, a computer which, in response to a transducer echo signal, executes a data collection routine which may span a time interval exceeding the time interval between successive pulses, means for routing the echo signals received by the transducers to the computer for recordation, and means for inhibiting, under the control of the computer, transmission of pulses to the transducers for at least part of the time during which the computer executes a data collection routine in response to a previous non-inhibited pulse.

BRIEF DESCRIPTION OF THE DRAWINGS

The invention will now be further illustrated graphically in which.

DESCRIPTION OF PRIOR ART

Figure 1:
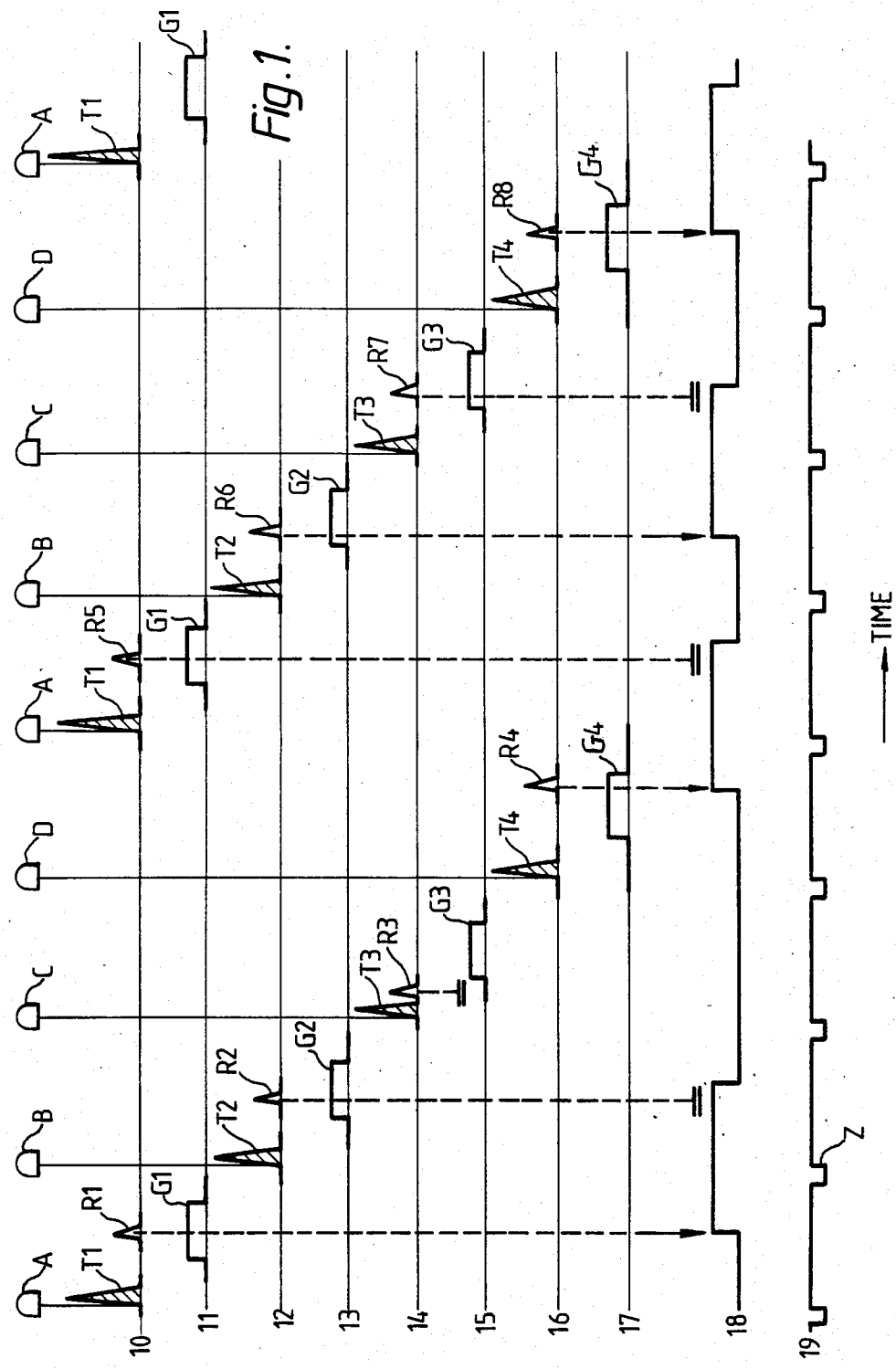
FIG. 1 illustrates graphically a prior art system which has a too high pulsing rate.

FIG. 1 shows ten graphs numbered 10–19 relating to a prior art system. Graph 19 shows equally-spaced triggers Z which initiate sequentially and repetitively the transmission of pulses from transducers marked A, B, C and D. The transmitted pulses T1 to T4 are shown hatched and the echoes R1 to R8 are shown unhatched in graphs 10, 12, 14 and 16.

Graphs 11, 13, 15 and 17 show gating intervals G1–G4 designed to allow "wanted" echoes R to arrive at a computer-based recording system. Graph 18 shows the periods of data recordation by the computer. Each "positive" square shape in graph 18 represents a time interval in which the computer is recording and is incapable of receiving further echo data. Echoes like R2, R5 and R7 falling within one of these time intervals are lost. Echoes like R1, R4, R6 and R8 pass their respective gates and initiate recording. Echoes like R3 are not detected as they do not fall within a gate G.

DESCRIPTION OF A PREFERRED EMBODIMENT

Figure 2:
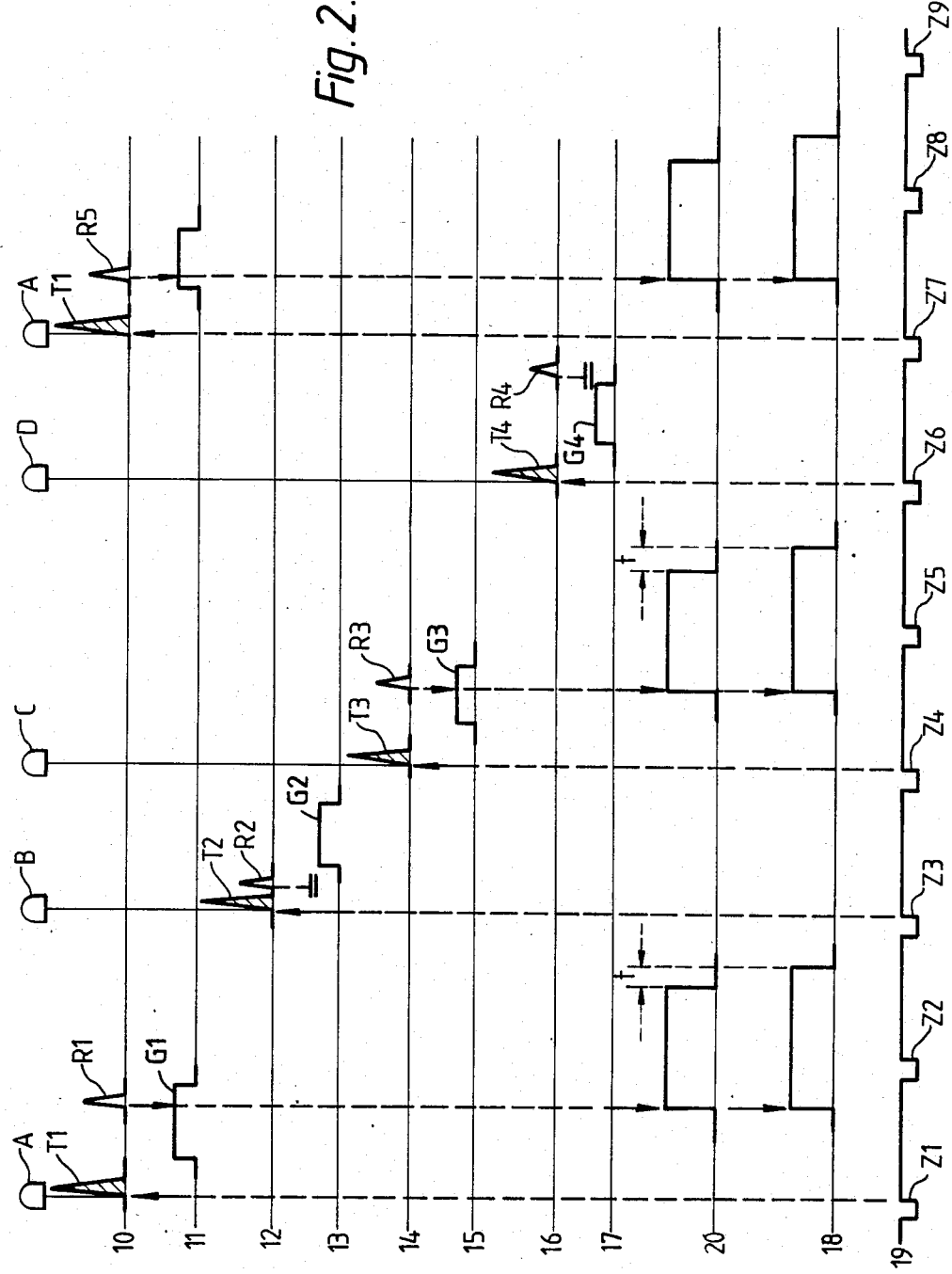
FIG. 2 illustrates graphically the inventive system.

In FIG. 2, a similar convention is adopted to that shown in FIG. 1 but an additional graph 20 located between graphs 17 and 18 exists. This graph shows a pulser inhibit situation. When an echo (like R1, R3 or R5) is received, which passes its respective gate, the data recording function of the computer is triggered and at the same time the pulser inhibit is also applied to inhibit the triggers Z from causing T2 and T4 to transmit until a set time t (the trailing edge of the square waves of graph 20) prior to the computer completing its recording operation. Thus in FIG. 2 triggers Z2, Z5 and Z8 are inhibited from setting off transmissions of pulses T whilst the triggers Z1, Z3, Z4, Z6, Z7 and Z9, which lie outside the timeing of the inhibit pulses (20) cause transmission of pulses T to take place.

In this way, no "wanted" pulses (i.e. those passing gates G) are lost due to a computer being engaged in recording at the time of their passage through the gates. On the other hand, if a transducer does not produce a "wanted" echo, it is dismissed quickly and the next transducer is pulsed. The data collection rate is therefore maximised.

Figure 3:
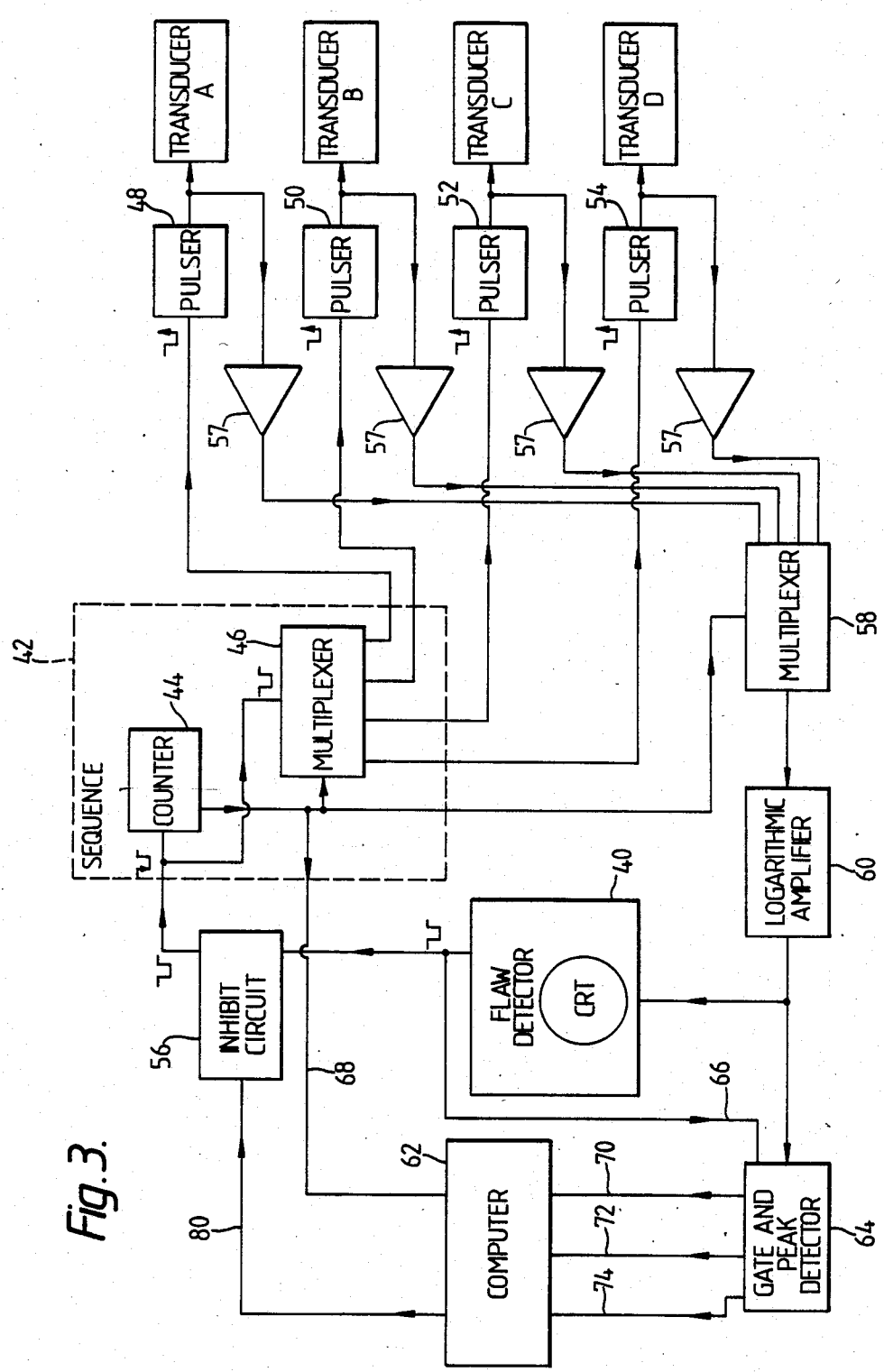
FIG. 3 is a block diagram of the data collection system in accordance with the invention.
Figure 4:
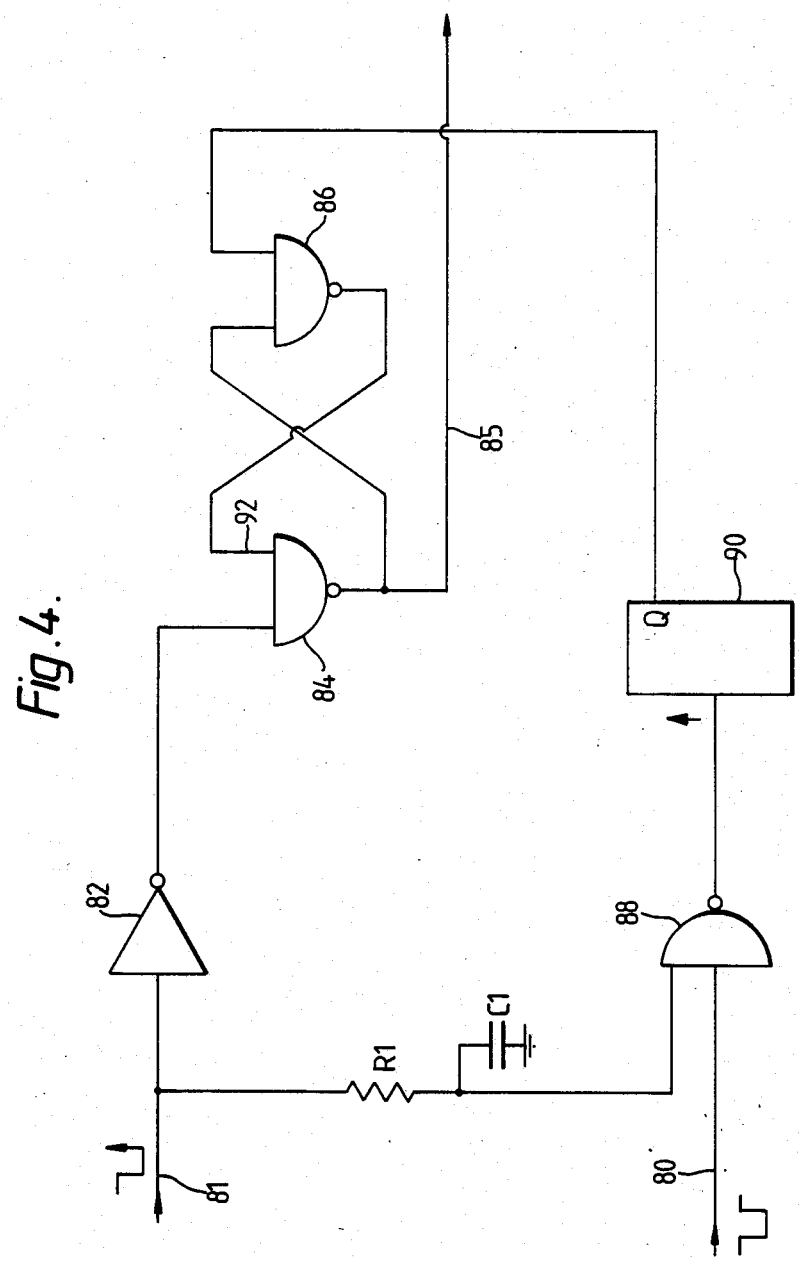
FIG. 4 is a diagram of an inhibit circuit of the system.

Referring now to FIGS. 3 and 4, the Z pulses referred to in the description of FIG. 2 are produced by a flaw detector 40 including a cathode ray tube, the trigger pulses corresponding to the time base of the latter. The trigger pulses are applied to a sequence controller 42 comprising a counter 44, which is advanced by the leading edges of the trigger pulses, and a multiplexer 46 which is controlled by the counter and depending on the count state of the latter routes the trigger pulses to pulser circuits 48–54. The pulser circuits are responsive to the trailing edges of the trigger pulses and serve to generate signal spikes for exciting the respective ultrasonic transducers A, B, C and D. In this case, where four transducers are employed, the counter is cycled repeatedly through a count of four by the trigger pulses provided these are not inhibited by an inhibit circuit 56 described below.

The echo signals from the transducers are routed by amplifier/filters 57 to a second multiplexer 58 which is also controlled by the counter 44. The output of the multiplexer 58 is routed to the flaw detector 40 via a logarithmic amplifier 60 and to a data collection computer 62 via the logarithmic amplifier and a gate/peak detector circuit 64. The circuit 64 provides the gating interval referred to in the description of FIGS. 1 and 2 and is synchronised with transducer operation by means of the trigger pulses applied on line 66.

The computer 62 has input lines 68, 70, 72 and 74. The input line 68 provides the current count status of the counter 44 and hence indicates the particular transducer being addressed. Input line 70 provides a signal indicating detection of an echo pulse within a gating interval which initiates execution of a data collection routine by the computer. Input lines 72 and 74 respectively provide data such as delay time before receipt of an echo and the amplitude of the echo signals. Thus, the data presented to the computer at input lines 70, 72 and 74 can be related to a particular transducer by means of the count value present on input line 68.

The inhibit circuit 56 is controlled by the computer via output line 80 and operates in the manner described with reference to FIG. 2, i.e. to inhibit trigger pulses which fall within the time interval during which the computer performs its data collection function. In practice, the inhibit may be removed before expiry of this time interval because of the delay inevitably introduced before an echo occurs. Operation of the inhibit circuit will now be described with reference to FIG. 4.

The trigger pulses from the flaw detector 40 are applied via line 81 to an inverter 82 which is connected to one input of a pair of cross-coupled NAND gates 84, 86 and the output 85 of NAND gate 84 is connected to the sequencer 42 (see FIG. 3). The output line 80 from the computer 62 is connected to NAND gate 88, the other input of which receives the trigger pulses via a delay circuit comprising resistor R1 and capacitor C1. The output of the NAND gate 88 clocks a monostable 90 which is triggered on the positive edge of the gate output and is reset when the output of gate 88 is low. The Q output of the monostable is coupled to one input of NAND gate 86.

When the computer produces an inhibit signal on line 80 when the line 81 is high, the monostable 90 is triggered causing input 92 of NAND gate 84 to go low and lock output 85 high, independently of the state of the signal on line 81. The circuit therefore inhibits transmission of trigger pulses from line 81 to line 85 and hence to the sequencer 42.

If the line 81 goes low (trigger pulse present) while line 80 is high (inhibit request from the computer absent), the trigger pulse will be transmitted to line 85 and the output of NAND gate 86 will be locked high, irrespective of the state of the output of the monostable 90. After a time delay introduced by R1, C1, the trigger pulse will be applied to the gate 88 thereby triggering the monostable. This, however, does not affect the output of gate 86 and consequently in the absence of an inhibit request on line 80, the trigger pulses on line 81 are propogated through to the line 85 and thence to the sequencer 42.

The circuit is arranged so that if the inhibit request on line 80 is removed while a trigger pulse is present on line 81, that trigger pulse is nevertheless inhibited thereby preventing application of a reduced width trigger pulse to the counter 44 and the pulsers 48–54. In these circumstances, the delay element C1, R1 will result in the application of a delayed trigger pulse to gate 88 thereby preventing resetting of the monostable.

A further feature of the circuit is that if the inhibit request signal is asserted erroneously for an unduly long time interval, after a preset time, monostable 90 will self-reset thereby allowing trigger pulses to be propogated from line 81 to line 85.

I claim:

1. An ultrasonic data collection system comprising means for generating pulses with a constant repetition rate, means for sequentially routing the pulses to a plurality of ultrasonic transducers so as to initiate triggering of the transducers in a predetermined sequence, a computer which, in response to a transducer echo signal, executes a data collection routine which may span a time interval exceeding the time interval between successive pulses, means for routing the echo signals received by the transducers to the computer for recordation, and means for inhibiting, under the control of the computer, transmission of pulses to the transducers for at least part of the time during which the computer executes a data collection routine in response to a previous non-inhibited pulse.

2. A system as claimed in claim 1 in which the computer is arranged to apply an inhibit request signal to said inibiting means for at least part of the time during which the computer executes a data collection routine.

3. A system as claimed in claim 2 in which the inhibiting means inhibits any trigger pulse which overlaps with the trailing edge of the inhibit request signal.

4. A system as claimed in claim 1 in which the sequence in which the transducers are triggered is undisturbed by inhibition of trigger pulses.

5. A system as claimed in claim 4 in which sequence control is governed by a counter which, in the absence of trigger pulse inhibition, is advanced through a count cycle by the trigger pulses and, when inhibition is imposed, remains in the same count state until the next non-inhibited trigger pulse is applied thereto.

* * * * *